(12) United States Patent
Park et al.

(10) Patent No.: US 11,509,869 B2
(45) Date of Patent: Nov. 22, 2022

(54) PIXEL ARRAY REDUCING LOSS OF IMAGE INFORMATION AND IMAGE SENSOR INCLUDING SAME

(71) Applicant: SAMSUNG ELECTRONICS CO., LTD., Suwon-si (KR)

(72) Inventors: Soyoun Park, Seoul (KR); Changsoo Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/080,892

(22) Filed: Oct. 27, 2020

(65) Prior Publication Data
US 2021/0243413 A1    Aug. 5, 2021

(30) Foreign Application Priority Data

Feb. 4, 2020  (KR) .................. 10-2020-0013305
May 12, 2020  (KR) .................. 10-2020-0056661

(51) Int. Cl.
*H04N 9/04* (2006.01)
(52) U.S. Cl.
CPC ..... *H04N 9/04557* (2018.08); *H04N 9/04515* (2018.08); *H04N 2209/046* (2013.01)
(58) Field of Classification Search
CPC ................................. H04N 9/04557

USPC .......................................................... 348/280
See application file for complete search history.

(56) References Cited

U.S. PATENT DOCUMENTS

| | | |
|---|---|---|
| 6,714,242 B1 | 3/2004 | Kobayashi |
| 7,499,089 B2 | 3/2009 | Matsutani |
| 8,571,312 B2 | 10/2013 | Chang et al. |
| 8,599,291 B2 | 12/2013 | Min et al. |
| 8,638,342 B2 | 1/2014 | Cote et al. |
| 2009/0200451 A1* | 8/2009 | Conners ............. H04N 5/37457 250/208.1 |

FOREIGN PATENT DOCUMENTS

| | | |
|---|---|---|
| EP | 3026892 A1 | 1/2016 |
| KR | 10-0565429 | 3/2006 |
| KR | 10-1660447 B1 | 9/2016 |
| WO | WO2016-200430 A1 | 12/2016 |

* cited by examiner

*Primary Examiner* — Joel W Fosselman
(74) *Attorney, Agent, or Firm* — Volentine, Whitt & Francos, PLLC

(57) ABSTRACT

A pixel array including; color filter array (CFA) cells, each respectively including CFA blocks, each CFA block including color pixels, and the color pixels include a sub-block. The sub-block includes at least one first color pixel sensing a first color, at least one second color pixel sensing a second color different from the first color, and at least one third color pixel sensing a third color different from the first color and the second color.

20 Claims, 15 Drawing Sheets

| 0 | 2 | 0 | 1 | 1.21 | 0 | 1.46 | 0 |
|---|---|---|---|---|---|---|---|
| 2 | 0 | 0 | 0 | 2 | 0 | 0 | 1.46 |
| 0 | 0 | 0 | 1 | 1.46 | 0 | 0 | 0 |
| 1 | 0 | 1 | 0 | 1.41 | 1.46 | 2 | 1.21 |
| 1.21 | 2 | 1.46 | 1.41 | 0 | 1 | 0 | 1 |
| 0 | 0 | 0 | 1.46 | 1 | 0 | 0 | 0 |
| 1.46 | 0 | 0 | 2 | 0 | 0 | 0 | 2 |
| 0 | 1.46 | 0 | 1.21 | 1 | 0 | 2 | 0 |

(a)

| 0 | 2 | 0 | 1.21 | 2.13 | 0 | 1.88 | 0 |
|---|---|---|---|---|---|---|---|
| 2 | 0 | 0 | 0 | 2 | 0 | 0 | 1.88 |
| 0 | 0 | 0 | 1.21 | 1.88 | 0 | 0 | 0 |
| 1.21 | 0 | 1.21 | 0 | 1.83 | 1.88 | 2 | 2.13 |
| 2.13 | 2 | 1.88 | 1.83 | 0 | 1.21 | 0 | 1.21 |
| 0 | 0 | 0 | 1.88 | 1.21 | 0 | 0 | 0 |
| 1.88 | 0 | 0 | 2 | 0 | 0 | 0 | 2 |
| 0 | 1.88 | 0 | 2.13 | 1.21 | 0 | 2 | 0 |

(b)

(b)

(c)

(d)

PIXEL ARRAY REDUCING LOSS OF IMAGE INFORMATION AND IMAGE SENSOR INCLUDING SAME

CROSS-REFERENCE TO RELATED APPLICATIONS

This application claims the benefit of Korean Patent Application No. 10-2020-0013305 filed on Feb. 4, 2020, and Korean Patent Application No. 10-2020-0056661 filed on May 12, 2020, the collective subject matter of which is hereby incorporated by reference.

BACKGROUND

The inventive concept relates to image sensors, and more particularly, image sensors including a pixel array that reduces loss of image information during signal processing.

Image sensors are devices which capture a two-dimensional (2D) or three-dimensional (3D) image of an object. Image sensors generate an image of an object by using a photoelectric conversion device which reacts based on the intensity of light reflected from the object. Recently, as complementary metal-oxide semiconductor (CMOS) technology advances, a CMOS image sensor (CIS) using a CMOS is being widely used.

Image sensors may include a pixel array, and as the image sensors are implemented to have a high resolution, the pixel array may include a number of color pixels. Mosaic processing based on interpolation and/or extrapolation may be performed for converting a raw image, output from an image sensor, into a certain pattern such as an RGB image, and when a distance to an adjacent color pixel capable of being referred to in such a processing process increases, there is a problem where the loss of image information occurs.

SUMMARY

The inventive concept provides a pixel array and an image sensor including the same that prevent increasing image loss during processing of an image captured by the image sensor.

According to an aspect of the inventive concept, there is provided a pixel array including; color filter array (CFA) cells, each respectively including CFA blocks, each CFA block including color pixels, and the color pixels include a sub-block, wherein the sub-block includes at least one first color pixel sensing a first color, at least one second color pixel sensing a second color different from the first color, and at least one third color pixel sensing a third color different from the first color and the second color.

According to an aspect of the inventive concept, there is provided an image sensor including; a pixel array including color filter array (CFA) cells, each CFA cell including CFA blocks, each CFA block including color pixels, and color pixels of each CFA block including a sub-block, wherein the sub-block includes at least one first color pixel sensing a first color, at least one second color pixel sensing a second color different from the first color, and at least one third color pixel sensing a third color different from the first color and the second color; a row driver configured to generate control signals that control the generation of pixel signals by the color pixels of the pixel array; a read circuit configured to generate pixel data from the pixel signals; and a controller configured to control the row driver and the read circuit.

According to an aspect of the inventive concept, there is provided an image sensor pixel array including; a plurality of color filter array (CFA) cells, each including a 2-by-2 arrangement of CFA blocks, wherein each CFA block includes color pixels of same color arranged in a boundary region of the CFA block surrounding a sub-block. wherein the sub-block includes at least one first color pixel sensing a first color, at least one second color pixel sensing a second color different from the first color, and at least one third color pixel sensing a third color different from the first color and the second color.

BRIEF DESCRIPTION OF THE DRAWINGS

Embodiments of the inventive concept will be more clearly understood upon consideration of the following detailed description taken in conjunction with the accompanying drawings in which:

FIG. 7 is an example of an interpolation distance calculated from a GR-GB-GR pattern pair of FIG. 4;

DETAILED DESCRIPTION

Figure 1:
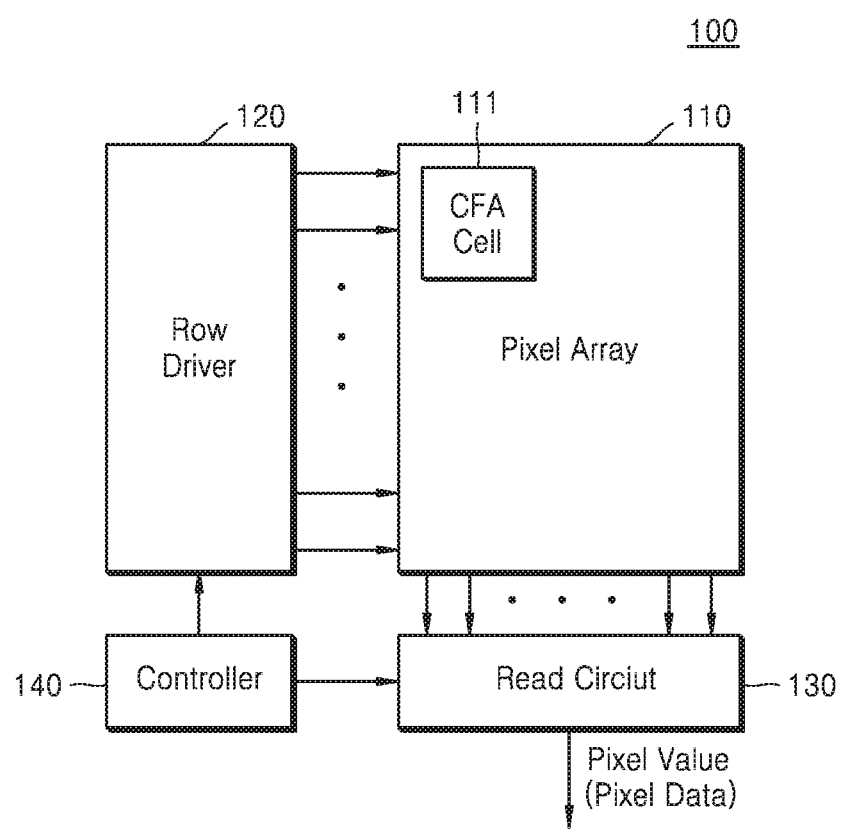
FIG. 1 is a block diagram illustrating an image sensor pixel array according to embodiments of the inventive concept.

Hereinafter, embodiments of the inventive concept will be described in some additional detail with reference to the accompanying drawings.

Figure (FIG.) 1 is a block diagram illustrating an image sensor 100 according to embodiments of the inventive concept. In certain embodiments, the image sensor 100 may include a complementary metal-oxide semiconductor (CMOS) image sensor (CIS). The image sensor 100 may include a pixel array 110, a row driver 120, a read circuit 130 and a controller 140, wherein the controller 140 may be used to control the row driver 120 and the read circuit 130.

The pixel array 110 may include pixels, wherein each pixel may include at least one photo-sensing device. Here, the photo-sensing device may detect (or sense) electromagnetic energy in a defined frequency band (hereafter, "incident light"). Accordingly, each pixel of the pixel array 110 and may generate an electrical signal corresponding to the intensity of the incident light. The photo-sensing device may include, for example, a photodiode, a photogate and/or a phototransistor. In certain embodiments, the pixels of the pixel array 110 may be color pixels arranged in various patterns. Accordingly, each color pixel may generate a corresponding electrical signal (hereafter, "a pixel signal") associated with one or more colors.

Various signal processing operations may be performed on the pixel signals provided by the pixel array 110. For example, a re-mosaic operation may be performed on pixel signals, and based on the re-mosaic operation, a pattern of the pixel array 110 may be converted into a desired pattern (e.g., a Bayer pattern).

In this regard, the pixel array 110 may output pixel signals, respectively corresponding to incident light absorbed by a photo-sensing device, to the read circuit 130. The row driver 120 may output a control signal for controlling each color pixel included in the pixel array 110. For example, the row driver 120 may output a control signal that resets photo-sensing device(s), or causes the photo-sensing device to output a pixel signal in response to accumulated electrical charge associated with the incident light.

The read circuit 130 may receive the pixel signals output by the pixel array 110 and generate a pixel value (or pixel data). For example, the read circuit 130 may include at least one analog-to-digital converter (ADC) configured to generate a digital signal corresponding to one or more of the analog pixel signal(s) as pixel data.

In this manner, the image sensor 100 of FIG. 1 may provide pixel data to an image processing device (not shown) capable of performing one or more digital signal processing operations (e.g., the re-mosaic operation). Such digital signal processing may be performed "internal" to the image sensor 100, as opposed to external signal processing that may be performed by a processing device other than the image sensor 100.

Hereinafter, certain implementation examples for the pixel array 110 and its constituent color pixels, according to embodiments of the inventive concept, will be described with reference to FIGS. 1, 2 and 3.

Figure 2:
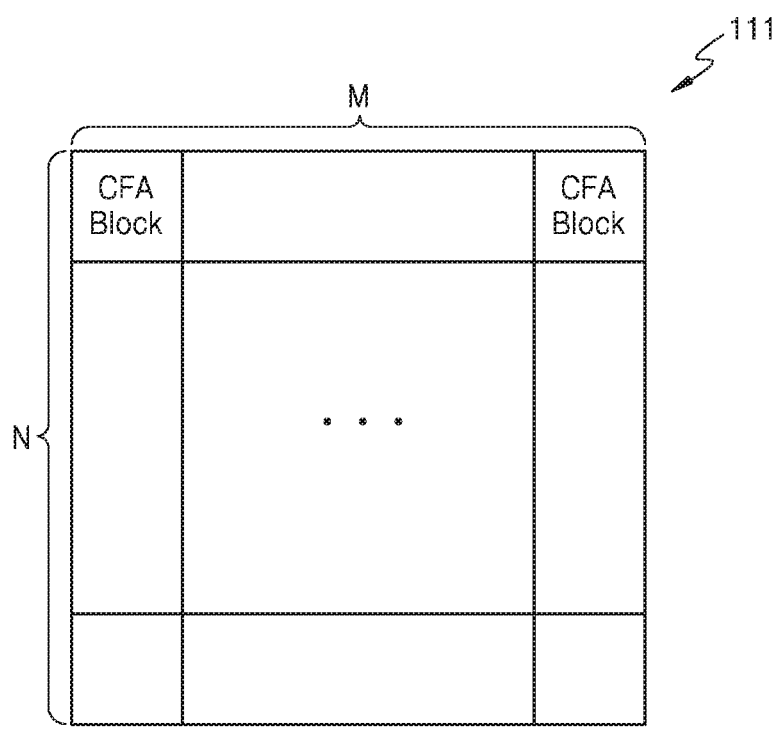
FIGS. 2 and 3 respectively illustrate examples of a pixel array according to embodiments of the inventive concept.

Referring to FIGS. 1 and 2, the pixel array 110 may include one or more color filter array(s) (CFA). In various arrangements these CFAs may be termed CFA cells. Here, each CFA may be disposed to sense certain color(s). Hereinafter, the terms "color filter", "color pixel", "filter array", and "pixel array" may be variously used in the description of exemplary CFAs.

For example, the CFA may be defined as a separate (or identifiable) element disposed in the pixel array 110 and including at least one photo-sensing device. Alternately, the CFA may be defined as a portion of an integral pixel array 110 (e.g., color pixels including corresponding color filter(s)). In this regard, a CFA cell, a CFA block, and/or a CFA sub-block may be understood as including at least one color pixel.

In certain embodiments, the pixel array 110 may include a number of CFA cells 111 defined by an arrangement of constituent units. For example, the pixel array 110 may include multiple CFA cells 111 disposed (or arranged) in a widthwise direction and a lengthwise direction. Each of the CFA cells 111 may include a certain number color pixels (i.e., have a defined "size." The color pixels forming a CFA cell may be variously arranged (e.g., in a defined matrix having a number of rows and a number of columns).

In certain embodiments, each of the CFA cells 111 may include multiple CFA blocks, wherein each of the CFA blocks has a defined structure (e.g., a minimum-sized structure). Accordingly, multiple CFA blocks may be repeated arranged to form a CFA cell 111 of desired size, shape and/or structure.

FIG. 2 shows one possible CFA 111 including M row-wise CFA blocks arranged in a lengthwise direction, and N column-wise CFA blocks arranged in a widthwise direction, where 'M' and 'N' are each an integer greater than 1. Accordingly, the CFA 111 of FIG. 2 may be described as including M-by-N (or M*N) CFA blocks.

Here, it should be noted that emerging, high-quality image sensors (e.g., CIS) may include a vast array and great number of color pixels. Accordingly, the size of CFA cells, as well as the number and size of the constituent CFA blocks may increase.

Accordingly, when a particular CFA block of the CFA cell 111 is associated with a single color (e.g., when a CFA block includes pixels sensing a single color), a distance between adjacent color pixels may become an increasingly important design factor. For example, adjacent color pixels may necessarily be referred to during certain signal processing operations, such as interpolation, extrapolation, etc.

So, given increasing CFA cell and CFA block sizes (e.g., as image sizes increase), the process of converting pixel data provided by image sensor 100 into (e.g.,) an RGB image may result in the loss of image information. That is, as the size of a CFA block increases, a distance between adjacent color pixels may increase, thereby increasing a loss rate.

Nonetheless, the pixel arrays according to embodiments of the inventive concept (e.g., pixel array 110 of the image sensor 100) may include a plurality of CFA cells 111, wherein each CFA cell 111 includes a plurality of CFA blocks, yet color pixels (or color filters) associated with each CFA cell 111 and/or CFA block may have a pattern that effectively decreases a loss rate during image processing operations.

An implementation example according to embodiments of the inventive concept will be described that assumes that each CFA cell 111 includes four (4) CFA blocks of equal size arranged widthwise and lengthwise in a 2-by-2 configuration. It is further assumed that a heterogeneous CFA block may be configured to sense at least two colors, rather than just a single color. In one example, a CFA block according to embodiments of the inventive concept may sense all colors applied to the pixel array 110. In various approaches, a CFA pattern including multiple CFA blocks may be designed to effectively decrease possible loss of image information.

Figure 3:
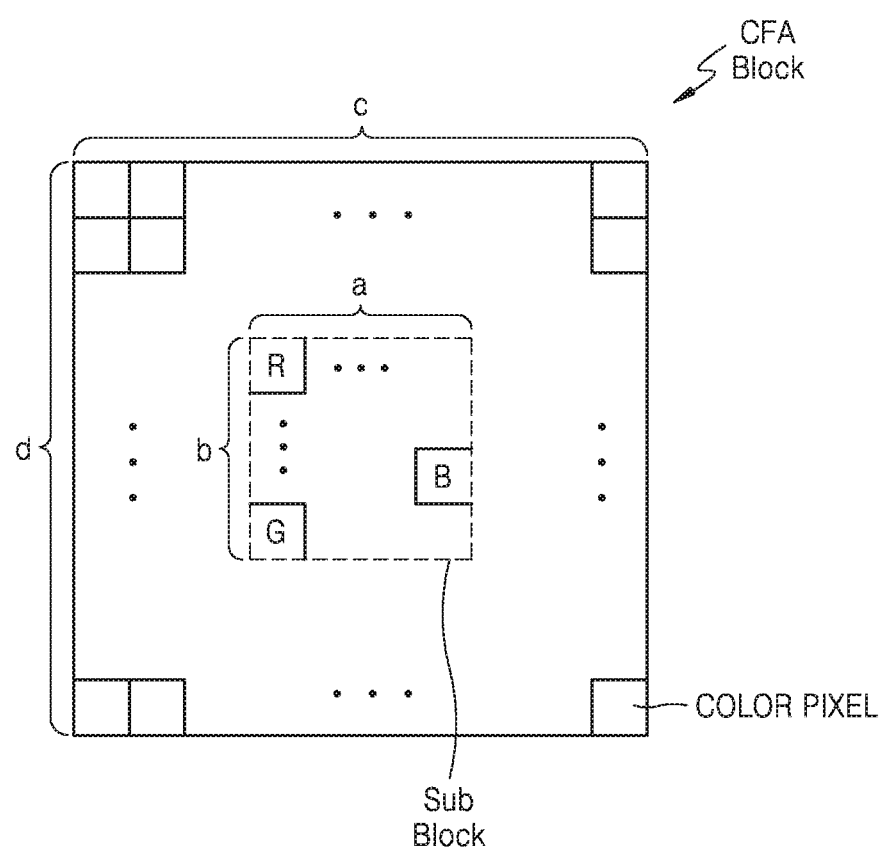

FIG. 3 shows one possible configuration for a CFA block according to embodiments of the inventive concept including color pixels arranged in a c-by-d (or c*d) matrix of color pixels, wherein 'c' and 'd' are each integers greater than 1. Here, each of the color pixels may be a red pixel, a blue pixel or a green pixel, for example, and the CFA block may include at least one red pixel, at least one blue pixel and/or at least one green pixel.

In the illustrated embodiment of FIG. 3, the CFA block is assumed to include two or more sub-blocks, wherein each sub-block includes, for example, an a-by-b (or a*b) matrix of color pixels, wherein 'a' and 'b' are each integers greater than 1.

In certain embodiments, at least two of first color pixels, second color pixels, and/or third color pixels of a CFA block (e.g., color pixels respectively sensing a first color, a second color and a third color) may be respectively disposed in particular region(s) of the CFA block (e.g., a boundary region, an inner region, a left region, a right region, an upper region, a lower region, etc.). For example, in the illustrated example of FIG. 3, each one of a red pixel R, a blue pixel B and a green pixel G is included in the sub-block, and may be respectively disposed in a boundary region of the CFA block. In this regard, certain embodiments of the inventive concept may define a "boundary region" as including at least some of an outer peripheral region. Further in this regard, certain embodiments of the inventive concept may include a boundary region surrounding (or at least partially surrounding) a centrally disposed sub-block.

In certain embodiments, based on a numbering of various color pixel types included in a CFA block, the CFA block may be regarded as either a first color (e.g., red) CFA block, a second color (e.g., blue) CFA block or a third color (e.g., green) CFA block. For example, when a number of red pixels is greatest (or predominates) among the color pixels of a CFA block, the CFA block may be regarded as a red CFA block. Alternately, if red pixels are predominately disposed in (around, or along) a boundary region of a CFA block, the CFA block may be regarded as a red CFA block.

In an embodiment described above, the red pixel, the blue pixel, and the green pixel each applied to the pixel array 110 are merely an example, and embodiments are not limited thereto. For example, color pixels based on various kinds of filters such as a cyan filter and an RGBW filter may be applied to embodiments, and embodiments are not limited to a pattern for sensing a certain color.

Figure 4:
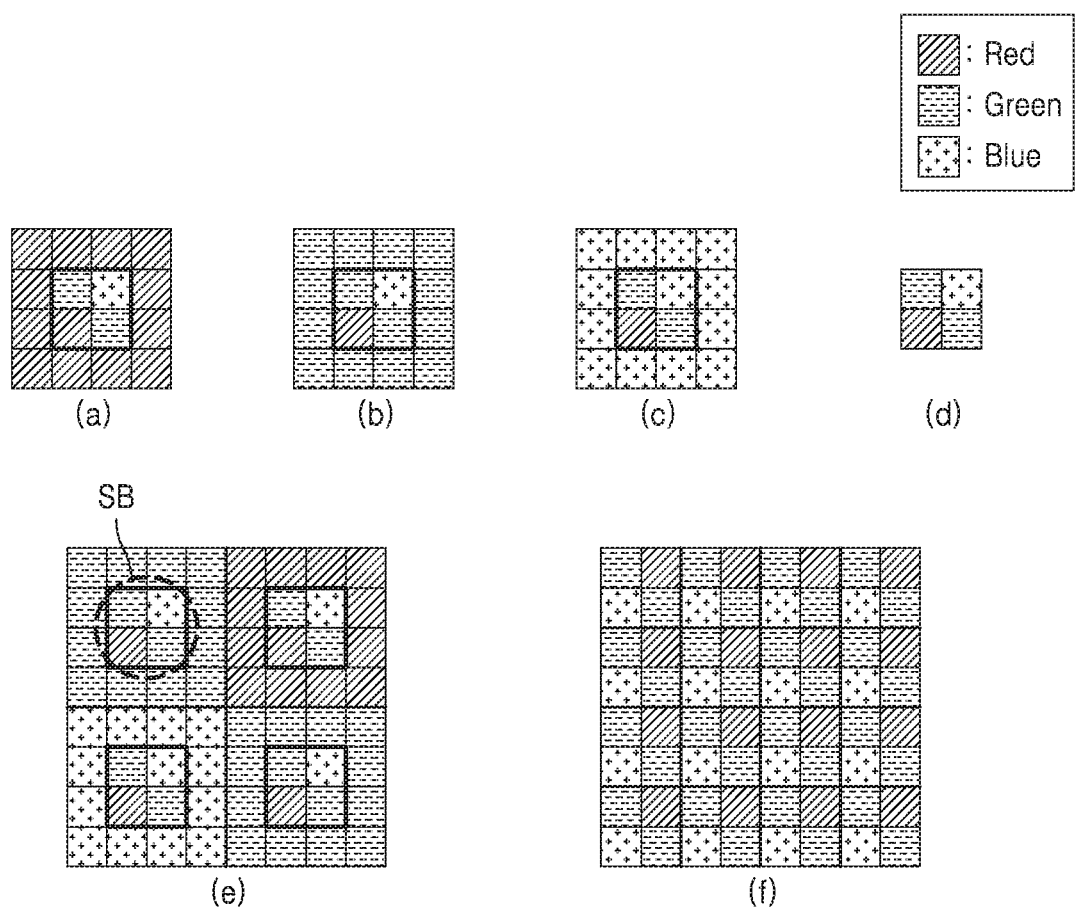
FIG. 4 is a conceptual diagram illustrating performance of a re-mosaic operation for a color pattern according to embodiments of the inventive concept.

FIG. 4, including FIGS. 4(a), 4(b), 4(c), 4(d), 4(e) and 4(f), is a conceptual diagram further illustrating a re-mosaic processing of a color pattern for a pixel array according to embodiments of the inventive concept. Here, a simple 8-by-8 CFA cell, including four (4) 4-by-4 CFA blocks arranged in a 2-by-2 (e.g., 2 rows and 2 columns) arrangement is assumed for the sake of clarity, but those skilled in the art will recognize that any reasonable number of color cells and/or CFA blocks might be used in other embodiments of the inventive concept. Here, the CFA cell pattern includes all of the 8-by-8 color cells. Thus, the CFA cell of FIG. 4(e) is assumed to include the four (4) heterogeneous, 4-by-4 CFA blocks. It is further assumed that the CFA cell of FIG. 4(e) includes red pixels, green pixels, and blue pixels, and that each of CFA blocks includes at least one red pixel, at least one green pixel and at least one blue pixel.

FIG. 4 illustrates the performing of a re-mosaic operation, whereby the CFA cell pattern of the 8-by-8 CFA cell of FIG. 4(e) is converted into the Bayer pattern of FIG. 4(f). Thus, the CFA cell pattern and the converted Bayer pattern may be referred to as a pattern CFA pair or a CFA pattern pair.

In the illustrated embodiment of FIG. 4, the first CFA block of FIG. 4(a) predominantly includes red pixels, and is referred to as a red CFA block. Similarly, the second CFA block of FIG. 4(b) predominantly includes green pixels, and is referred to as a green CFA block, and the third CFA block of FIG. 4(c) predominantly includes blue pixels, and is referred to as a blue CFA block. In this context, it should be noted that the term "predominately includes" refers to the disposition of a particular type of color pixel around the boundary of respective CFA blocks. However, this need not always be the case, and different embodiments of the inventive concept may variously and differently define the type or designation of a particularly colored CFA block according to various definitions of the term "predominately includes", such as (e.g.,) a relative numerical count of different color pixels in the CFA block, a relative, positional disposition of various color pixels in the CFA block, etc.

As illustrated in FIG. 4(e), the exemplary, 8-by-8 CFA cell includes a red CFA block (upper right), two (2) green CFA blocks (upper left and lower right) and a blue CFA block (lower left).

Each of the green CFA blocks, the red CFA block and the blue CFA block includes a sub-block having a defined size and/or a defined composition of color pixels. For example, the sub-block may be a 2-by-2 arrangement of color pixels.

In certain embodiments, each sub-block will include at least one red pixel, at least one green pixel and at least one blue. In certain embodiments, the respective color pixels of the sub-block will be identically arranged (e.g., green-blue-red-green from top to bottom and left to right in the illustrated example of FIG. 4(d).

In the example of FIG. 4(a), a 4-by-4 red CFA block may include thirteen (13) red pixels, two (2) green pixels, and one (1) blue pixel. In the example of FIG. 4(b), a 4-by-4 green CFA block may include one (1) red pixel, fourteen (14) green pixels, and one (1) blue pixel. In the example of FIG. 4(c), a 4-by-4 blue CFA block may include one (1) red pixel, two (2) green pixels, and thirteen (13) blue pixels. Of further note, the red CFA block, the green CFA block and the blue CFA block of FIGS. 4(a), 4(b) and 4(c) each includes the 2-by-2 sub-block shown in FIG. 4(d). Here, for convenience of description, the 8-by-8 CFA cell of FIG. 4(e) may be referred to as a GR-GB pattern cell based on two letters of each of a GRBG CFA block and GBRG pixels of a sub-block.

With the foregoing exemplary embodiments in mind, a CFA cell may be converted into one of various color patterns using re-mosaic operation. That is, the CFA cell of FIG. 4(e) may be converted into the Bayer pattern of FIG. 4(f). As shown in FIG. 4(f), the Bayer pattern obtained by conversion using a re-mosaic operation may have a structure in which a plurality of 2-by-2 pixels are repeatedly arranged. For example, the 2-by-2 pixels may include green-red-blue-green (GRBG) pixels arranged in the order of an upper left portion, an upper right portion, a lower left portion and a lower right portion. For convenience of description, a pair of a GR-GB pattern cell and a GRBG following the re-mosaic operation to obtain the Bayer pattern may be referred to as a GR-GB-GR pattern pair.

Respective interpolation of red, green, and blue may be required in order to convert the 8-by-8 CFA cell into the Bayer pattern using a re-mosaic operation by applying a pattern pair of each of FIG. 4(e) and FIG. 4(f). Assuming a case wherein interpolation is performed on green, edge information for an image may include relatively more red color information and/or blue color. Accordingly, neighbor green pixels needed for interpolation in each of four (4) directions (e.g., a forward slash direction, a back slash direction, a horizontal direction and a vertical direction) may be selected and an average of distances to n (where 'n' is an integer greater than 1) adjacent green pixels. The selection of neighbor green pixels may be made in a close order on the basis of a direction with respect to a target pixel (e.g., a center pixel) on which interpolation is calculated. This approach may be used, as one of many possibilities, to calculate an interpolation distance relative to the target pixel. Alternately, in cases wherein interpolation is performed on blue and/or on red, one or more neighbor pixels may be selected regardless of a direction with respect to the target pixel on which interpolation is calculated.

Figure 5:
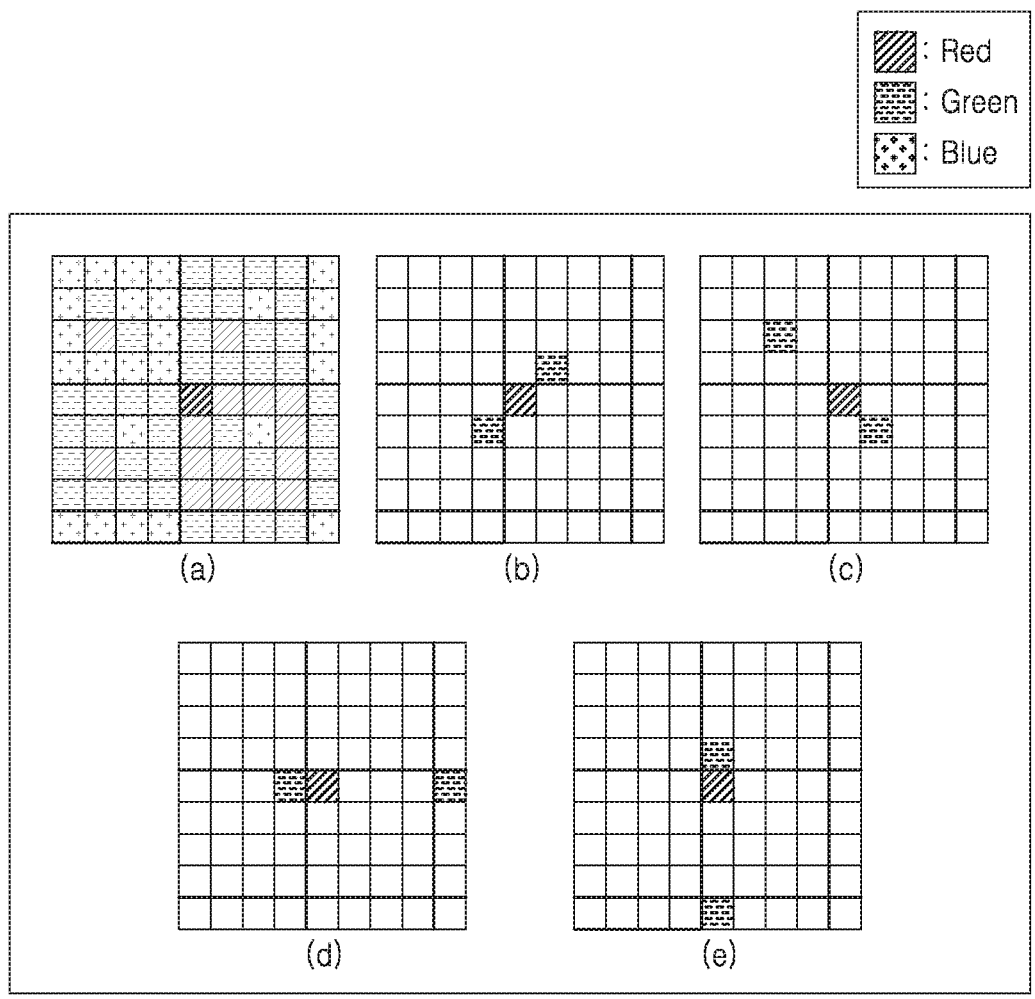
FIGS. 5 and 6 are respective diagrams illustrating an example of an interpolation distance determination approach.
Figure 6:
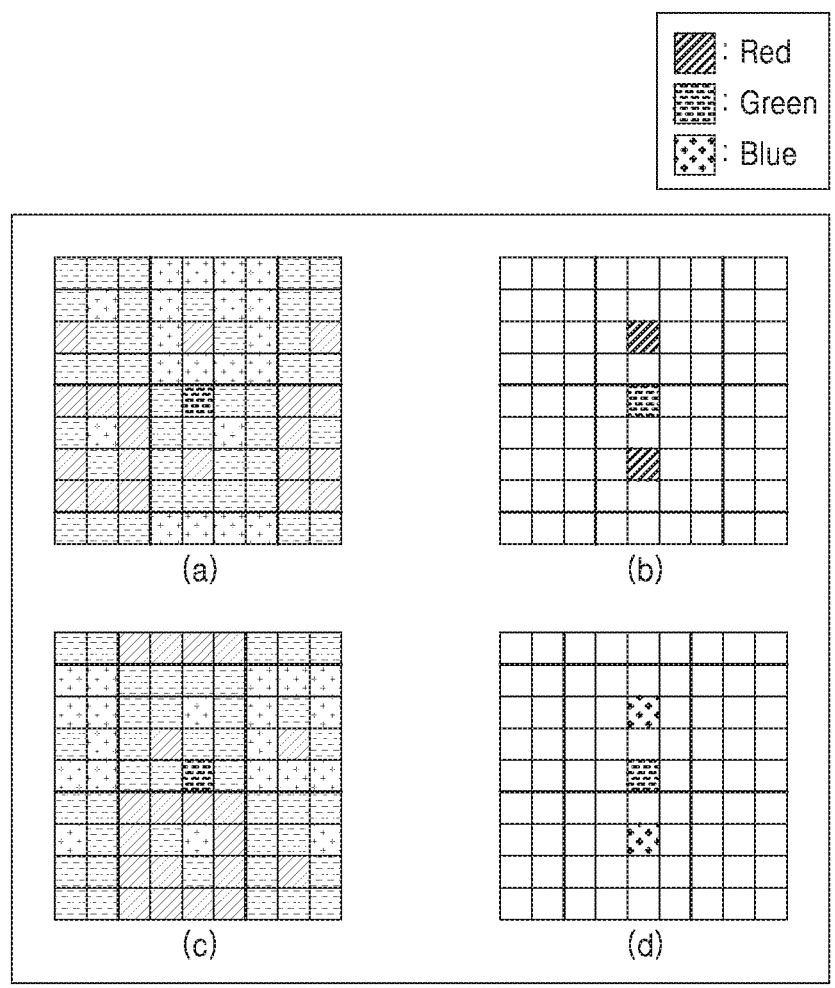

FIGS. 5 and 6 are conceptual diagrams further illustrating an example of determining an interpolation distance. In FIG. 5, an interpolation distance is determined for an interpolation of green, and in FIG. 6 an interpolation distance is determined for an interpolation of red and blue. FIGS. 5 and 6 illustrate an example wherein two (2) neighbor color pixels are selected in each direction during interpolation, however, the inventive concept is not limited thereto. In other embodiments, more than two (2) neighbor color pixels may be selected and interpolation performed.

Referring to FIG. 5, including FIGS. 5(a), 5(b), 5(c), 5(d) and 5(e), multiple sets of two (2) neighbor green pixels closest to each other in each particular direction are selected for interpolation of green. Thus, neighbor green pixels closest to each other in the forward slash, back slash, horizontal and vertical directions relative to a target pixel (e.g., a center red pixel). Relative to FIG. 5(b), a first interpolation distance may be calculated as 1.21, when n, which is the number of neighbor pixels, is 1. Relative to FIG. 5(c), a second interpolation distance may be calculated as 2.13 when n, which is the number of neighbor pixels, is 2, and relative to FIG. 5(d) and FIG. 5(e), third and fourth interpolation distances may be similarly calculated when the number "n" of neighbor pixels is 3 or more.

FIG. 6, including FIGS. 6(a), 6(b), 6(c) and 6(d), illustrates an example of interpolation distances being determined for interpolation of red relative to a target pixel (e.g., a center green pixel) (ref. FIG. 6(a) and FIG. 6(b), and/or interpolation of blue relative to the target pixel (ref. FIG. 6(c) and FIG. 6(d)).

In interpolation of red and blue, one or more neighbor pixels closest to each other with respect to a center pixel may be selected regardless of direction, and an average of distances between the selected neighbor pixels and the target pixel on which interpolation is calculated may be calculated as an interpolation distance of a red/blue. FIG. 6 illustrates an example where two (2) neighbor pixels closest to each other are selected in interpolation of red and blue, and two (2) neighbor red pixels closest to each other in a vertical direction may be selected as illustrated in FIG. 6(b). Also, two neighbor blue pixels closest to each other in a vertical direction may be selected as illustrated in FIG. 6(d). In such a case, an interpolation distance relative to the target pixel of FIG. 6(a) may be calculated as 2.0 when the number "n" of neighbor pixels is 1, and an interpolation distance relative to the target pixel of FIG. 6(c) may be calculated as 2.0 when the number "n" of neighbor pixels is 2. Also, even when the number "n" of neighbor pixels is 3 or more, a value of an interpolation distance may be calculated similarly.

In certain embodiments, as described above, a CFA cell may include CFA blocks (e.g., 2-by-2 CFA blocks), and each of the CFA blocks may include a sub-block (e.g., 2-by-2 color pixels) having a certain pattern, thereby decreasing an interpolation distance calculated in relation to a target pixel. For example, as illustrated in FIG. 4, each CFA block may include a color pixels associated with at least two (2) different colors, instead a single color. Further, each CFA block may include at least one red pixel, at least one green pixel and at least one blue pixel. Accordingly, neighbor color pixels in relatively close position with respect to the target pixel may be selected.

Also, in certain embodiments, referring to a pattern pair in the embodiment of FIG. 4, color pixels (e.g., 2-by-2 color pixels, indicated by 'SB') of a sub-block in a CFA cell may have the same color pattern as that of pixels at the same position in a converted Bayer pattern, and thus, an interpolation distance of each of the color pixels in the sub-block of the CFA cell may be calculated as 0. Therefore, according to embodiments, an average interpolation distances, as ultimately calculated, for a CFA cell may be reduced, and thus, an image loss rate(s) may decrease in interpolation and/or extrapolation processing operation using a re-mosaic operation, for example.

FIG. 7 is a set of charts including FIGS. 7(a) and 7(b), further illustrating the determination (or calculation) of an interpolation distance in relation to the GR-GB-GR pattern pair of FIGS. 4(e) and 4(f).

Here, respective interpolation distances (or values) may be calculated by applying the above-described calculation method to all re-mosaic adjusted color pixels. As illustrated in FIG. 7, an interpolation distance of each of color pixels in a sub-block included in each of CFA blocks of a CFA cell may be calculated as 0. Also, in the other color pixels, an interpolation distance of each of neighbor color pixels referred to for interpolation may decrease by using the pattern pair of each of FIG. 4(e) and FIG. 4(f). Thus, a total average of interpolation distances calculated in a CFA cell may be minimized, thereby minimizing the loss of image information.

Hereinafter, examples of various color filter arrays that may be implemented according to embodiments of the inventive concept will be described. However, the scope of the inventive concept is not limited to only the illustrated examples. And in relation to a detailed example of a color filter array described below, the arrangement of detailed pixels of a color filter array may be modified under a condition where certain benefits of the inventive concept may be achieved.

Figure 8:
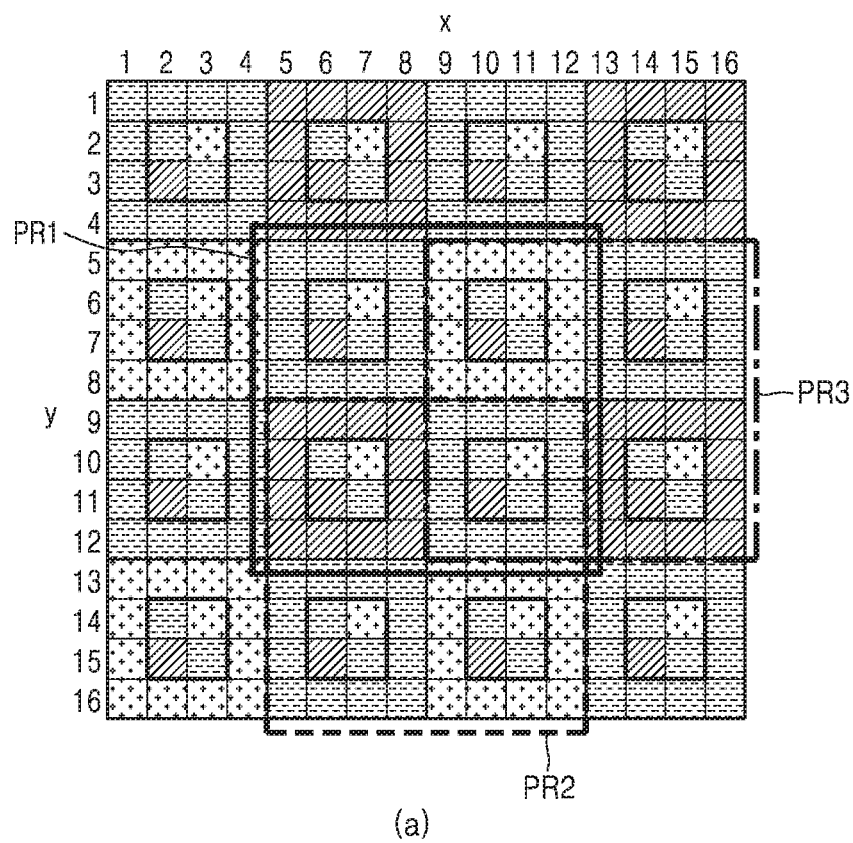
FIGS. 8, 9, 10 and 11 are respective diagrams illustrating various examples of a pixel array according to embodiments of the inventive concept.
Figure 8:
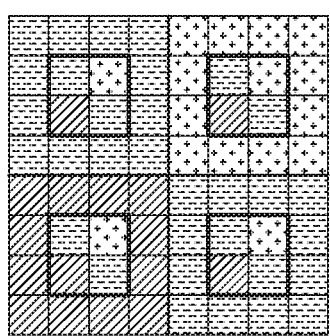
Figure 8:
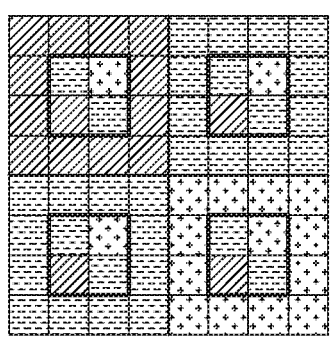
Figure 8:
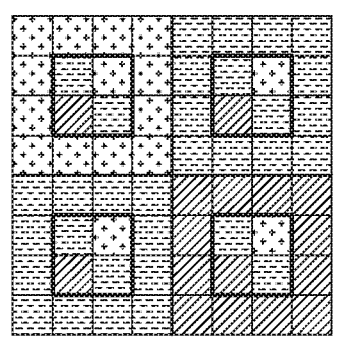
Figure 8:
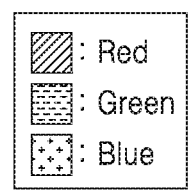
Figure 9:
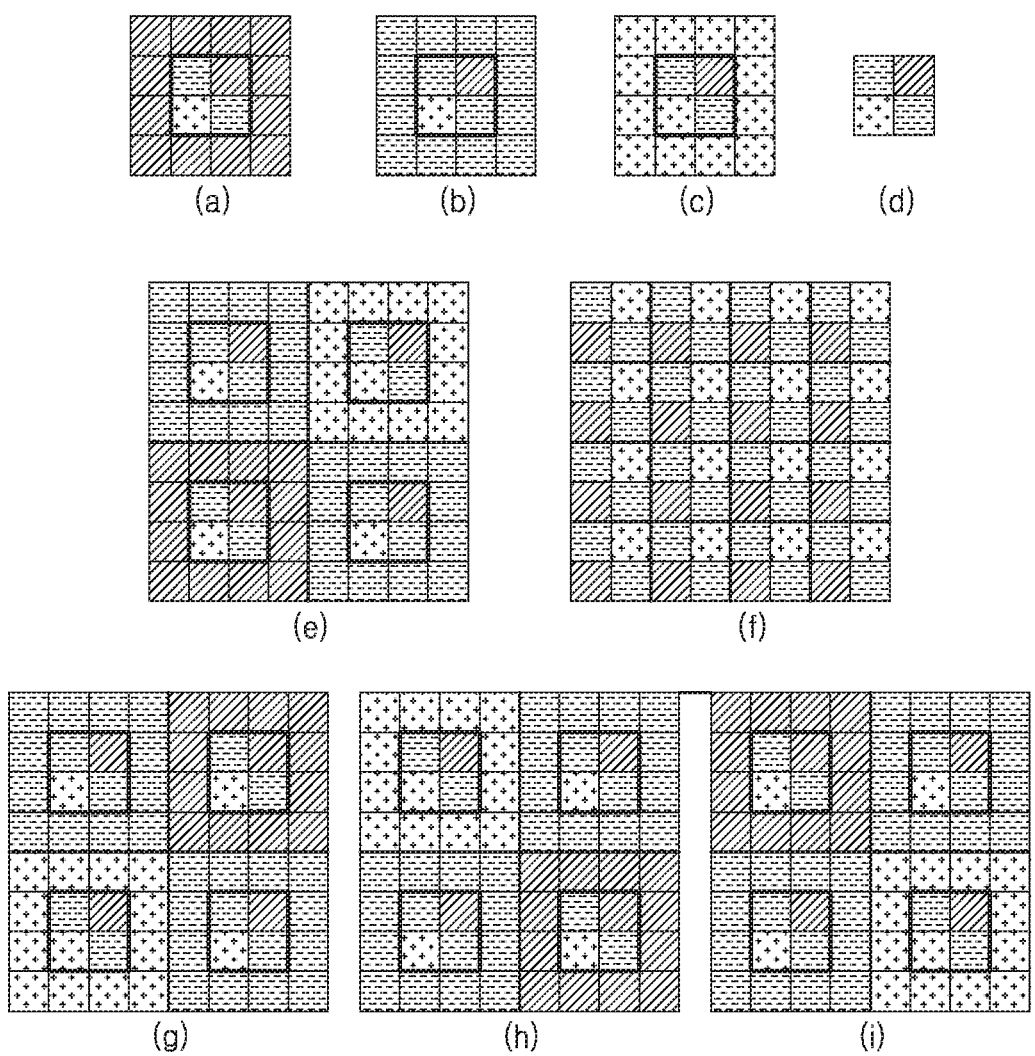
Figure 10:
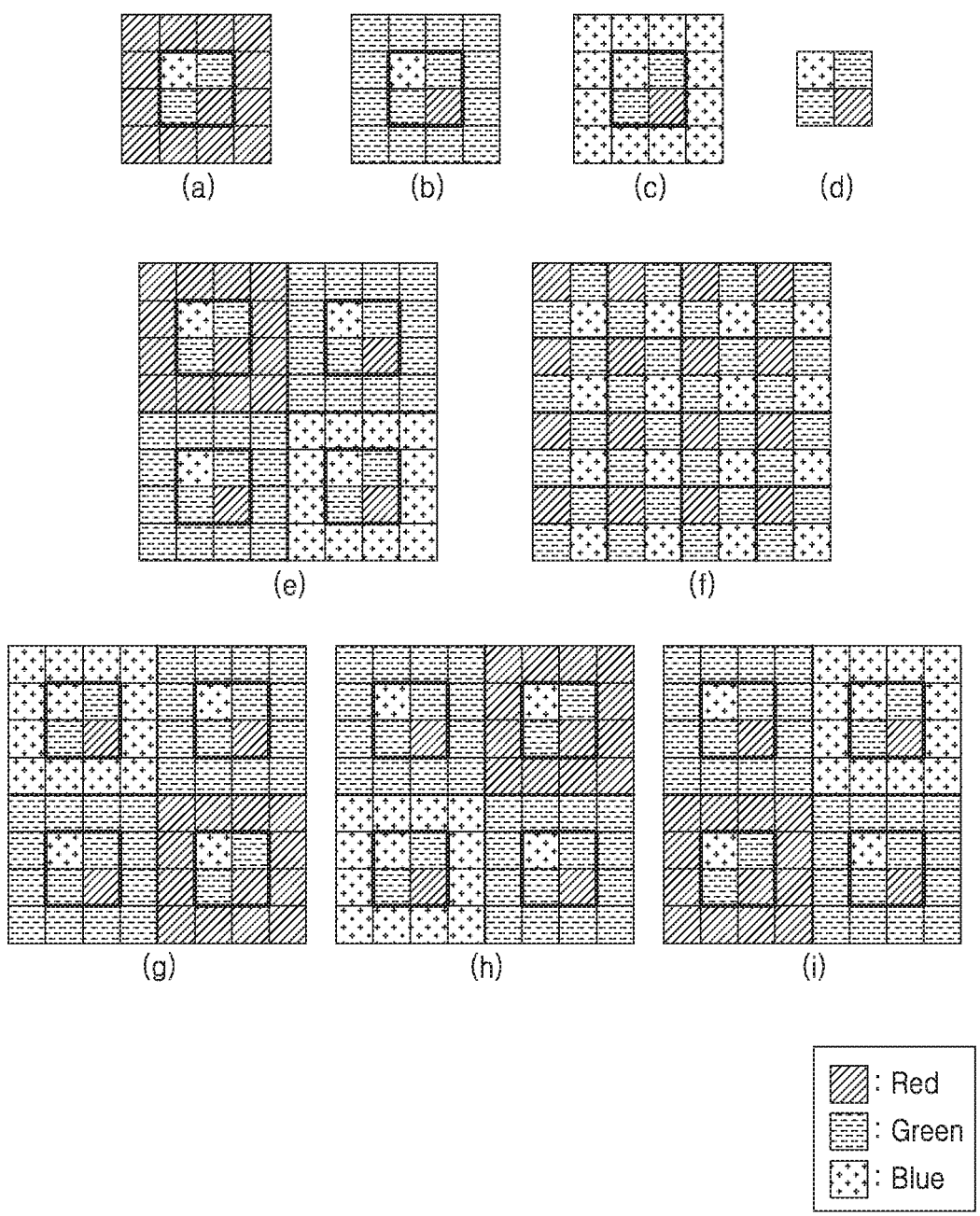

FIG. 8, including FIGS. 8(a), 8(b), 8(c) and 8(d); FIG. 9, including FIGS. 9(a), 9(b), 9(c), 9(d), 9(e), 9(f), 9(g), 9(h) and 9(i); FIG. 10, including FIGS. 10(a), 10(b), 10(c), 10(d), 10(e), 10(f), 10(g), 10(h) and 10(i); and FIG. 11, including FIGS. 11(a), 11(b), 11(c), 11(d), 11(e), 11(f), 11(g), 11(h) and 11(i) (collectively, "FIGS. 8 to 11") are diagrams illustrating additional examples of pixel arrays according to embodiments of the inventive concept.

Here again, a CFA cell may include color pixels disposed in various patterns. For example, a pattern pair illustrated in each of FIGS. 8 to 11 may be generated through modifications based on various methods such as flip, mirror, transpose, and/or crop as performed on the pattern pair of FIG. 4.

For example, a pattern pair illustrated in FIG. 8 may correspond to a pattern pair obtained through modification where crop is applied to the pattern pair of FIG. 4. Also, a pattern pair illustrated in FIG. 9 may correspond to a pattern pair obtained through modification where transpose is applied to the pattern pair of FIG. 4 or transpose and crop are applied to the pattern pair of FIG. 4, and a pattern pair illustrated in FIG. 10 may correspond to a pattern pair obtained through modification where mirror is applied to the pattern pair of FIG. 4 or mirror and crop are applied to the pattern pair of FIG. 4. Also, a pattern pair illustrated in FIG. 11 may correspond to a pattern pair obtained through modification where flip is applied to the pattern pair of FIG. 4 or flip and crop are applied to the pattern pair of FIG. 4.

Figure 11:
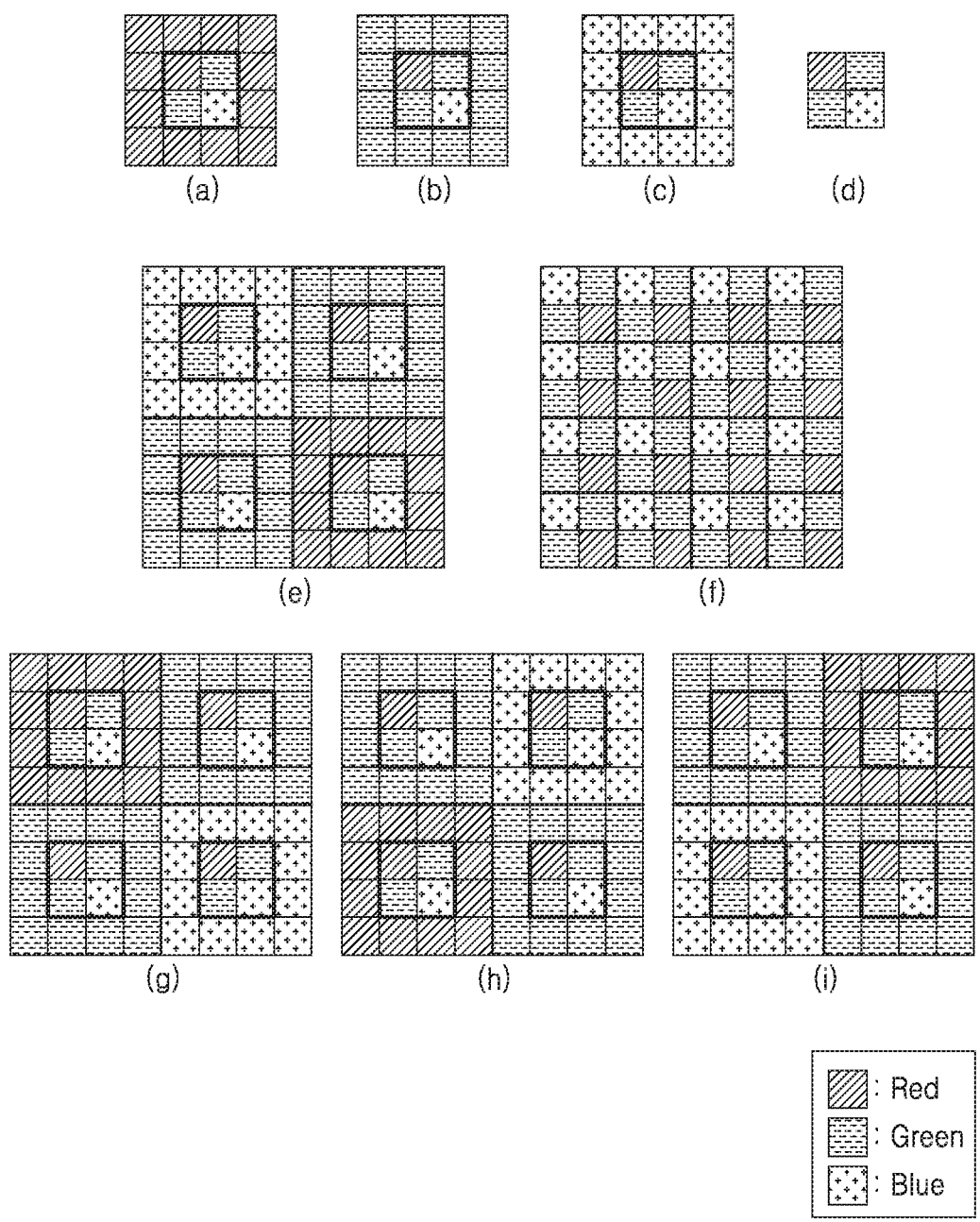

In the above description, the pixel array according to embodiments may include CFA cells having a pattern illustrated in FIG. 4, or may include CFA cells having a pattern illustrated in FIG. 11. Also, the pixel array according to embodiments may have various patterns which are variously modifiable, in addition to patterns described herein. Also, the terms "flip", "mirror", "transpose", and "crop" described above may be terms for describing concepts of various patterns applied to a CFA cell according to embodiments, and the pixel array according to embodiments of the inventive concept may optionally include various kinds of CFA cells described herein.

Referring to FIG. 8, CFA cells according to the embodiment of FIG. 4 may be repeatedly arranged in a widthwise direction and a lengthwise direction, and each of the CFA cells may include a green CFA block disposed at an upper left portion, a red CFA block disposed at an upper right portion, a blue CFA block disposed at a lower left portion, and a green CFA block disposed at a lower right portion. Also, each of a green CFA block, a red CFA block, and a blue CFA block may include a sub-block having the same certain size (e.g., 2-by-2 in size) as the illustration of FIG. 4, and the sub-block may include a green pixel, a blue pixel, a red pixel, and a green pixel in the order of an upper left portion, an upper right portion, a lower left portion, and a lower right portion.

In FIG. 8, color pixels where the CFA cell having a 8-by-8 size illustrated in FIG. 4(e) is repeated in a widthwise direction and a lengthwise direction twice each are illustrated, and in this case, coordinates of a color pixel disposed at a leftmost and uppermost portion may be defined as (1, 1) and coordinates of a color pixel disposed at a rightmost and leftmost portion may be defined as (16, 16).

According certain embodiments, a CFA cell having various patterns may be defined, and for example, by performing crop on a region PR1 from (5, 5) to (12, 12), of FIG. 8(b) illustrates a GB-GB CFA pattern cell including green-blue-red-green (GBRG) CFA blocks arranged in the order of an upper left portion, an upper right portion, a lower left portion and a lower right portion, with respect to (x, y) coordinates defined in FIG. 8(a). Also, by performing crop on a region PR2 from (5, 9) to (12, 16), (c) of FIG. 8 illustrates an RG-GB CFA pattern cell including red-green-green-blue (RGGB) CFA blocks arranged in the order of an upper left portion, an upper right portion, a lower left portion and a lower right portion, and by performing crop on a region PR3 from (9, 5) to (16, 12), of FIG. 8(d) illustrates a BG-GB CFA pattern cell including blue-green-green-red (BGGR) CFA blocks arranged in the order of an upper left portion, an upper right portion, a lower left portion and a lower right portion. Also, each of the GB-GB CFA pattern cell, the RG-GB CFA pattern cell, and the BG-GB CFA pattern cell each illustrated in FIG. 8 may include the same sub-block as the sub-block illustrated in FIG. 4(d), and moreover, CFA pattern cells illustrated in FIG. 8 and a GRBG Bayer pattern illustrated in FIG. 4(f) may configure a pair.

That is, in CFA cells according embodiments like the ones illustrated in FIG. 8, the relative position of CFA blocks may be changed, as compared with the CFA cell illustrated in FIG. 4(e), but color pixels of a sub-block included in each of CFA blocks may have the same pattern as a pattern illustrated in FIG. 4(e). Also, in certain embodiments, color pixels of a sub-block in a CFA cell may have the same pattern as that of pixels at the same position in a converted Bayer pattern.

FIG. 9 illustrates a CFA cell and a Bayer pattern implementable according to embodiments, and for example, a pattern pair illustrated in FIG. 9 may correspond to a case where transpose is applied to a pattern pair illustrated in each of FIG. 4(e) and FIG. 4(f) or transpose and crop are applied thereto.

A CFA cell according to embodiments may have a plurality of patterns illustrated in FIGS. 9(e), 9(g), 9(h), and 9(i). Also, a Bayer pattern obtained through conversion based on a re-mosaic operation performed on color pixels of a CFA cell may have a pattern illustrated in f FIG. 9(f).

As in FIGS. 9(e), 9(g), 9(h), and 9(i), a CFA cell may include four (4) heterogeneous 4-by-4 red/green/blue CFA blocks, and a sub-block including 2-by-2 color pixels may be disposed in each CFA block. Also, sub-blocks of CFA blocks of FIGS. 9(e), 9(g), 9(h), and 9(i) may be implemented to be equal to one another, and as illustrated in FIG. 9(d), may each include green-red-blue-green color pixels arranged in the order of an upper left portion, an upper right portion, a lower left portion and a lower right portion.

According to various embodiments, as illustrated in FIG. 9(e), a CFA cell may include green-blue-red-green CFA blocks arranged in the order of an upper left portion, an upper right portion, a lower left portion and a lower right portion, and this may be referred to as a GB-GR pattern cell. The GB-GR pattern cell of FIG. 9(e) may have a structure which is symmetrical with the GR-GB pattern cell according to an embodiment described above in a backslash direction (or a diagonal axis).

As illustrated in FIG. 9(g), a CFA cell may include green-red-blue-green CFA blocks arranged in the order of an upper left portion, an upper right portion, a lower left portion and a lower right portion, and this may be referred to as a GR-GR pattern cell. Also, a CFA cell of FIG. (h) may include blue-green-green-red CFA blocks arranged in the order of an upper left portion, an upper right portion, a lower left portion and a lower right portion, and this may be referred to as a BG-GR pattern cell. Also, a CFA cell of FIG. 9(i) may include red-green-green-blue CFA blocks arranged in the order of an upper left portion, an upper right portion, a lower left portion and a lower right portion, and this may be referred to as an RG-GR pattern cell. Each of the CFA cells illustrated in FIGS. 9(e), 9(g), 9(h), and 9(i) and a GBRG Bayer pattern of FIG. 9(f) may configure a pattern pair.

FIG. 10 illustrates a CFA cell and a Bayer pattern implementable according to other various embodiments, and for example, a pattern pair illustrated in FIG. 10 may correspond to a case where mirror is applied to a pattern pair illustrated in each of FIG. 4(e) and FIG. 4(f) or mirror and crop are applied thereto. A CFA cell according to embodiments may have a plurality of patterns illustrated in FIGS. 10(e), 10(g), 10(h), and 10(i). Also, a Bayer pattern obtained through conversion based on a re-mosaic operation performed on color pixels of a CFA cell may have a pattern illustrated in FIG. 10(f).

As shown in FIGS. 10(e), 10(g), 10(h), and 10(i), a CFA cell may include four (4) heterogeneous 4-by-4 red/green/blue CFA blocks, and a sub-block including 2-by-2 color pixels may be disposed in each CFA block. Also, sub-blocks of CFA blocks of FIGS. 10(e), 10(g), 10(h), and 10(i) may be implemented to be equal to one another, and as illustrated in FIG. 10(d), may each include blue-green-green-red color pixels arranged in the order of an upper left portion, an upper right portion, a lower left portion and a lower right portion.

According to various embodiments, as illustrated in FIG. 10(e), a CFA cell may include red-green-green-blue CFA blocks arranged in the order of an upper left portion, an upper right portion, a lower left portion and a lower right portion, and this may be referred to as an RG-BG pattern cell. Also, the RG-BG pattern cell of FIG. 10(e) may have a structure which is symmetrical with the GR-GB pattern cell with respect to a lengthwise axis by applying mirror to the GR-GB pattern cell according to an embodiment described above.

As illustrated in FIG. 10(g), a CFA cell may include blue-green-green-red CFA blocks arranged in the order of an upper left portion, an upper right portion, a lower left portion and a lower right lower, and this may be referred to as a BG-BG pattern cell. Also, a CFA cell FIG. 10(h) may include green-red-blue-green CFA blocks arranged in the order of an upper left portion, an upper right portion, a lower left portion and a lower right portion, and this may be referred to as a GR-BG pattern cell. Also, a CFA cell of FIG. 10(i) may include green-blue-red-green CFA blocks arranged in the order of an upper left portion, an upper right portion, a lower left portion and a lower right portion, and this may be referred to as a GB-BG pattern cell. Each of the CFA cells illustrated in FIGS. 10(e), 10(g), 10(h), and 10 and an RGGB Bayer pattern of FIG. 10(f) may configure a pattern pair.

FIG. 11 illustrates a CFA cell and a Bayer pattern implementable according to other embodiments, and for example, a pattern pair illustrated in FIG. 11 may correspond to a case where flip is applied to a pattern pair illustrated in each of FIG. 4(e) and FIG. 4(f) or flip and crop are applied thereto. A CFA cell according to embodiments may have a plurality of patterns as illustrated in FIGS. 11(e), 11(g), 11(h), and 11(i). Also, a Bayer pattern obtained through conversion based on a re-mosaic operation performed on color pixels of a CFA cell may have a pattern illustrated in FIG. 11(f).

As shown in FIGS. 11(e), 11(g), 11(h), and 11(i), a CFA cell may include four (4) heterogeneous 4-by-4 red/green/blue CFA blocks, and a sub-block including 2-by-2 color pixels may be disposed in each CFA block. Also, sub-blocks of CFA blocks of FIGS. 11(e), 11(g), 11(h), and 11(i) may be implemented to be equal to one another, and as illustrated in FIG. 11(d), may each include red-green-green-blue color pixels arranged in the order of an upper left portion, an upper right portion, a lower left portion and a lower right portion.

According to various embodiments, as illustrated in FIG. 11(e), a CFA cell may include blue-green-green-red CFA blocks arranged in the order of an upper left portion, an upper right portion, a lower left portion and a lower right portion, and this may be referred to as a BG-RG pattern cell. Also, the BG-RG pattern cell of FIG. 11(e) may have a structure which is symmetrical with the GR-GB pattern cell with respect to a widthwise axis by applying flip to the GR-GB pattern cell according to an embodiment described above.

As illustrated in FIG. 11(g), a CFA cell may include red-green-green-blue CFA blocks arranged in the order of an upper left portion, an upper right portion, a lower left portion and a lower right portion, and this may be referred to as an RG-RG pattern cell. Also, a CFA cell of FIG. 11(h) may include green-blue-red-green CFA blocks arranged in the order of an upper left portion, an upper right portion, a lower left portion and a lower right portion, and this may be referred to as a GB-RG pattern cell. Also, a CFA cell of FIG. 11(i) may include green-red-blue-green CFA blocks arranged in the order of an upper left portion, an upper right portion, a lower left portion and a lower right portion, and this may be referred to as a GR-RG pattern cell. Each of the CFA cells illustrated in FIGS. 11(e), 11(g), 11(h), and 11(i) and a BGGR Bayer pattern of FIG. 11(f) may configure a pattern pair.

According to embodiments described above, a color pattern of a pixel array may be variously configured, and for example, a plurality of colors (for example, red (R), green (G), and blue (B) colors) may be together sensed in a CFA block which is implemented to have a certain size, and thus, distances to neighbor color pixels used in interpolation and/or extrapolation processing may decrease, thereby reducing image loss. In embodiments described above, it has been described that color pixels of an outer region in one CFA block sense the same color, but a pixel array may be implemented so that at least one color pixel of the outer region senses a different color. Also, it has been described that two green pixels are disposed in each sub-block, but in embodiments, some color pixels of each sub-block may be modified.

Figure 12:
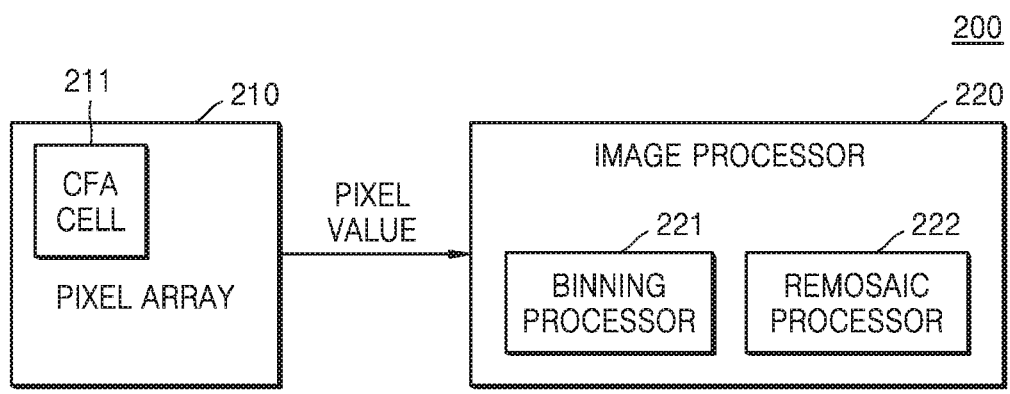
FIG. 12 is a block diagram illustrating an example of an image processing device including an image sensor according to an embodiment.

FIG. 12 is a block diagram illustrating an image processing device 200 including an image sensor according to embodiments of the inventive concept.

Referring to FIG. 12, the image processing device 200 may include a pixel array 210 including a CFA, and moreover, may include an image processor 220 which performs image processing by using pixel values from the pixel array 210. According to an embodiment, the image sensor described above may include the pixel array 210, and moreover, may include at least some of elements included in the image processor 220.

The pixel array 210 may include a plurality of CFA cells 211 having various patterns according to embodiments described above and may provide the image processor 220 with pixel values based on a plurality of color pixels disposed in the pixel array 210. Also, the image processor 220 may include various kinds of logic devices for processing the pixel values to generate image data, and for example, the image processor 220 may include a binning processor 221 and a re-mosaic processor 222. Based on control by the binning processor 221, image processing may be performed by using pixel values having a relatively high resolution in selecting a high image quality mode, or image processing may be performed by using pixel values having a relatively low resolution in selecting a low image quality mode. Also, the re-mosaic processor 222 may perform an interpolation operation on each pixel in association with re-mosaic processing, and according to embodiments described above, pixel values corresponding to a Bayer pattern may be generated by using pixel values of CFA cells.

Figure 13:
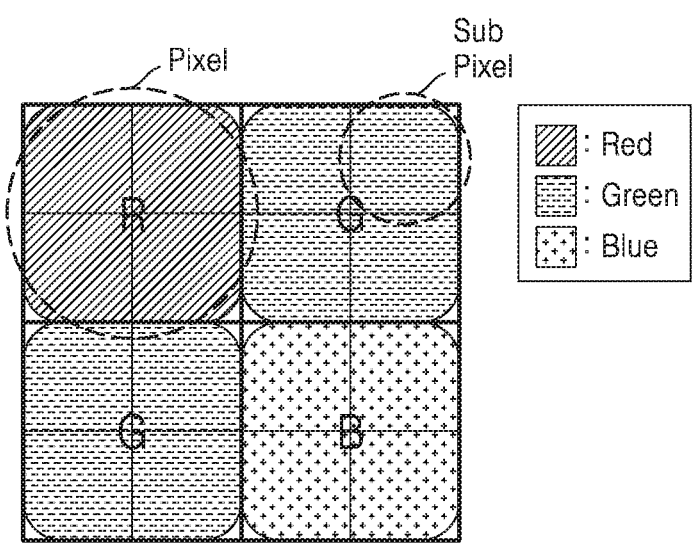
FIG. 13 is a diagram illustrating an implementation example of a color pixel according to an embodiment.

FIG. 13 is a diagram illustrating one possible implementation example of a color pixel according to embodiments of the inventive concept.

According to embodiments described above, each color pixel may include a color filter corresponding thereto, and moreover, may include a photo-sensing device (for example, a photodiode) for sensing light (or a color).

According to an implementation embodiment, one color pixel may include a plurality of subpixels. For example, in FIG. 13, an example where each color pixel includes 2-by-2 subpixels, but each color pixel may include more subpixels. Also, the photo-sensing device may be disposed by subpixel units, and thus, a plurality of photo-sensing devices may be disposed based on one color pixel. Also, although not shown in FIG. 13, the image sensor according to an embodiment may include a plurality of micro-lenses (not shown), and the micro-lenses may be disposed by pixel units or may be disposed by subpixel units.

In calculating a pixel signal corresponding to each color pixel, at least some of signals generated from a plurality of subpixels may be used. For example, assuming that a color pixel disposed at an upper left portion of FIG. 13 is a red pixel and a plurality of subpixels sense a red color identically, a pixel signal provided from a corresponding red pixel may be generated through processing based on at least some of signals generated from the plurality of subpixels.

Embodiments may be variously implemented, and for example, signals generated by sensing two or more colors may be provided from one color pixel. For example, a plurality of color filters for sensing different colors may be disposed in a plurality of subpixels included in one color pixel, and each color pixel may be variously implemented within a range for decreasing an interpolation distance according to embodiments described above.

In describing the embodiments, for convenience of description, various pattern pairs based on crop, transpose, mirror, and flip or various pattern pairs based on a combination thereof have been described, but embodiments are not limited thereto. For example, other concepts such as rotation and shift may be applied based on the CFA cell illustrated in FIG. 4 and the like, and thus, CFA cells and pattern pairs according to embodiments may be implemented.

Also, in the embodiments, the 8-by-8 CFA cells where a 1-by-1 pixel is a minimum unit have been described above, but in embodiments, the minimum unit is not limited to the 1*1 pixel and a color pattern may be implemented based on a condition where q*r (where 'q' is a positive integer and 'r' is a positive integer) number of pixel groups are a minimum unit.

Figure 14:
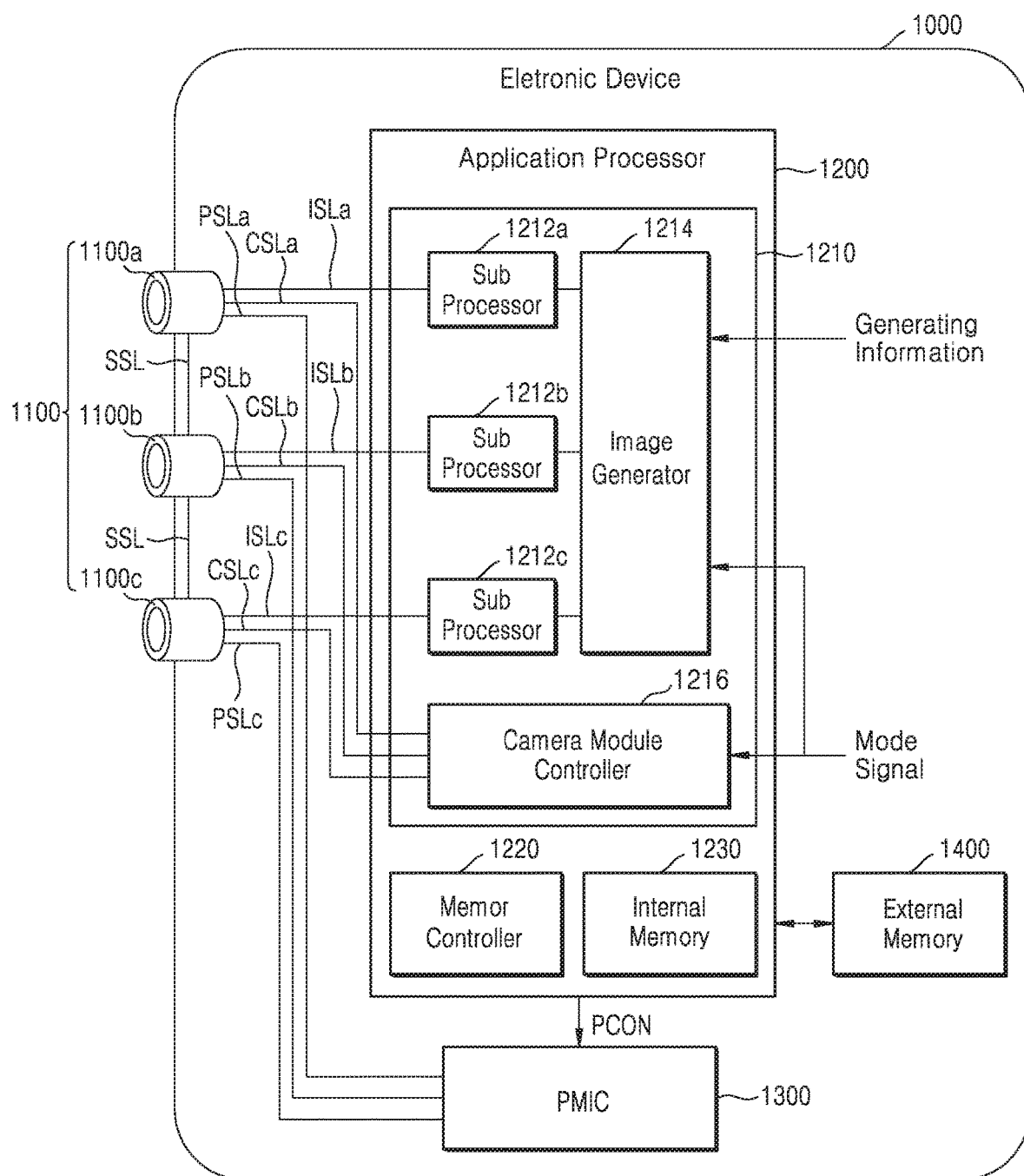
FIG. 14 is a block diagram of an electronic device including a multi-camera module to which an image sensor according to an embodiment is applied.
Figure 15:
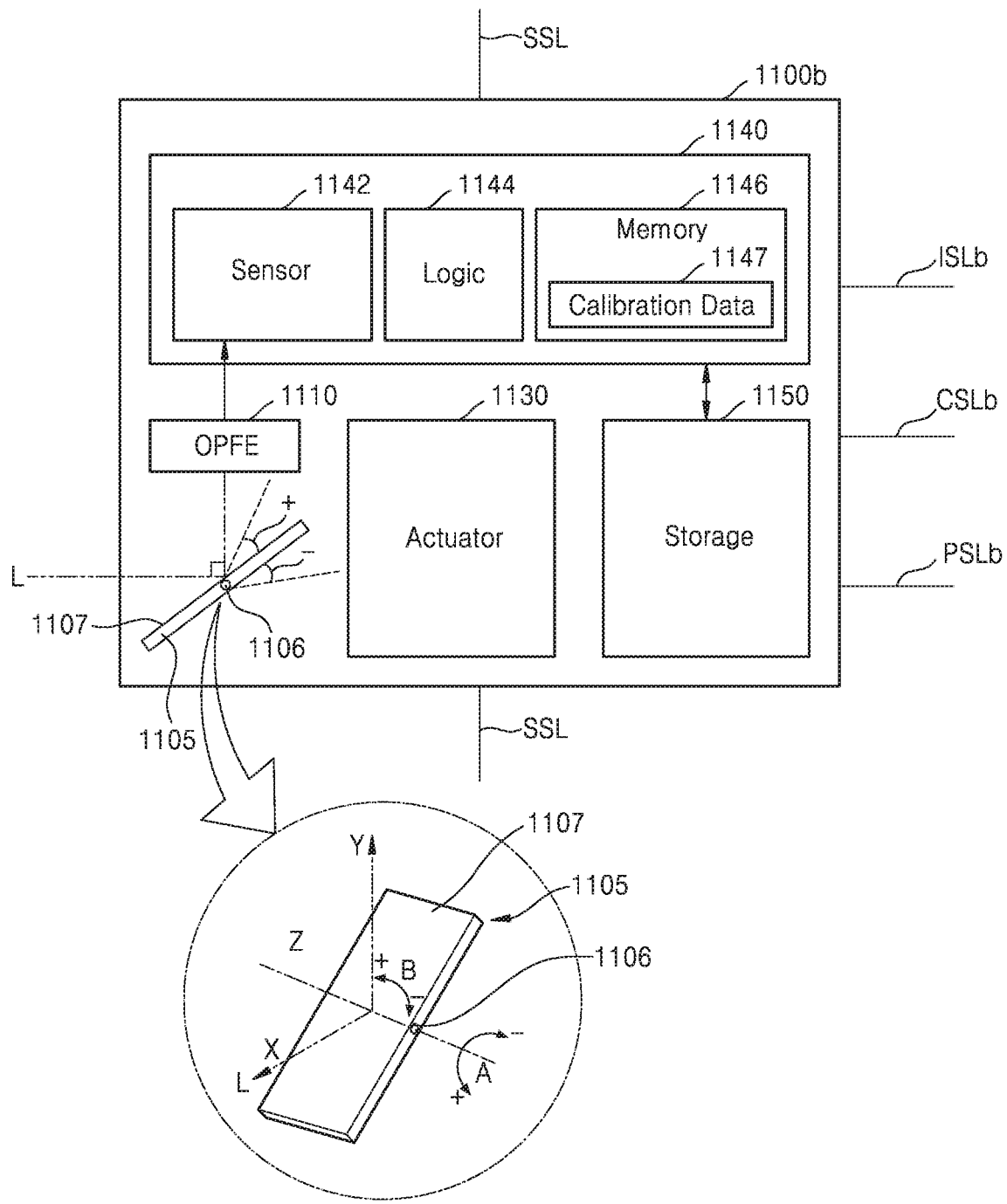
FIG. 15 is a block diagram of the camera module of FIG. 14.

FIG. 14 is a block diagram of an electronic device 1000 including a multi-camera module to which an image sensor according to an embodiment is applied. FIG. 15 is a detailed block diagram of a camera module of FIG. 14.

Referring to FIG. 14, the electronic device 1000 may include a camera module group 1100, an application processor 1200, a power management integrated circuit (PMIC) 1300, and an external memory 1400.

The camera module group 1100 may include one or more camera modules 1100a, 1100b, and 1100c. Although an embodiment where three camera modules 1100a, 1100b, and 1100c are provided is illustrated in the drawing, but embodiments are not limited thereto. In some embodiments, the camera module group 1100 may be modified to include only two camera modules. Also, in some embodiments, the camera module group 1100 may be modified to include n (where n is a natural number of 4 or more) number of camera modules.

Hereinafter, a detailed configuration of the camera module 1100b will be described with reference to FIG. 15, but the following description may be identically applied to the other camera modules 1100a and 1100c according to embodiments.

Referring to FIG. 15, the camera module 1100b may include a prism 1105, an optical path folding element (OPFE) 1110, an actuator 1130, an image sensing device 1140, and a storage 1150.

The prism 1105 may include a reflective surface 1107 including a light-reflecting material and may change a path of light L incident from the outside.

In some embodiments, the prism 1105 may change the path of the light L, which is incident in a first direction X, to a second direction Y vertical to the first direction X. Also, the prism 1105 may rotate the reflective surface 1107 including the light-reflecting material in an A direction with respect to a center shaft 1106, or may rotate the center shaft 1106 in a B direction to change the path of the light L, which is incident in the first direction X, to the second direction Y vertical thereto. In this case, the OPFE 1110 may move in a third direction Z that is vertical to the first direction X and the second direction Y.

In some embodiments, as illustrated, a maximum rotation angle of the prism 1105 in the A direction may be 15 degrees or less in a +A direction and may be greater than 15 degrees in a −A direction, but embodiments are not limited thereto.

In some embodiments, the prism 1105 may be move at about 20 degrees, at 10 degrees to 20 degrees, or at 15 degrees to 20 degrees in a +B or −B direction. Here, a moving angle may be the same in the +B or −B direction, or the prism 1105 may move up to an almost similar angle within a range of about 1 degree.

In some embodiments, the prism 1105 may move the reflective surface 1107 including the light-reflecting material in a third direction (for example, a Z direction) parallel to an extension direction of the center shaft 1106.

The OPFE 1110 may include, for example, m (where m is a natural number) number of optical lenses grouped into m number of groups. The m optical lenses may move in the second direction Y to change an optical zoom ratio of the camera module 1100b. For example, in a case where a basic optical zoom ratio of the camera module 1100b is Z, when the m optical lenses included in the OPFE 1110 move, the optical zoom ratio of the camera module 1100b may be changed to an optical zoom ratio of 3 Z, 5 Z, or more than 5 Z.

The actuator 1130 may move the OPFE 1110 or the optical lens to a certain position. For example, the actuator 1130 may adjust a position of the optical lens so that the image sensor 1142 is placed at a focal length of the optical lens, for accurate sensing.

The image sensing device 1140 may include the image sensor 1142, a control logic 1144, and a memory 1146. The image sensor 1142 may sense an image of a sensed object by using the light L provided through the optical lens. According to an embodiment described above, the image sensor 1142 may include a pixel array, and a color pattern of each of a plurality of color pixels included in the pixel array may be based on a pattern of each of a CFA cell, a CFA block, and a sub-block in the embodiments described above.

The control logic 1144 may control all operations of the camera module 1100b. For example, the control logic 1144 may control an operation of the camera module 1100b on the basis of a control signal provided through a control signal line CSLb.

The memory 1146 may store information, needed for an operation of the camera module 1100b, such as calibration data 1147. The calibration data 1147 may include information which is needed for the camera module 1100b to generate image data by using the light L provided from the outside. The calibration data 1147 may include, for example, information about the degree of rotation described above, information about a focal length, and information about an optical axis. When the camera module 1100b is implemented as a type of multi-state camera where a focal length thereof varies based on a position of an optical lens thereof, the calibration data 1147 may include a position-based focal length value of the optical lens and information associated with auto focusing.

The storage 1150 may store image data sensed through the image sensor 1142. The storage 1150 may be disposed outside the image sensing device 1140 and may be implemented as a type which is stacked on or under a sensor chip configuring the image sensing device 1140. In some embodiments, the storage 1150 may be implemented with electrically erasable programmable read-only memory (EEPROM), but embodiments are not limited thereto.

Referring to FIGS. 14 and 15, in some embodiments, each of the plurality of camera modules 1100a, 1100b, and 1100c may include the actuator 1130. Therefore, each of the plurality of camera modules 1100a, 1100b, and 1100c may include the same or different calibration data 1147 based on an operation of the actuator 1130 included therein.

In some embodiments, one (for example, the camera module 1100b) of the plurality of camera modules 1100a, 1100b, and 1100c may include a camera module of a folded lens type including the prism 1105 and the OPFE 1110 described above, and the other camera modules (for example, the camera modules 1100a and 1100c) may include a vertical-type camera module including no prism 1105 and OPFE 1110. However, embodiments are not limited thereto.

In some embodiments, one (for example, the camera module 1100c) of the plurality of camera modules 1100a, 1100b, and 1100c may include a vertical-type depth camera which extracts depth information by using infrared ray (IR).

In this case, the application processor 1200 may merge image data, provided from the depth camera, and image data provided another camera module (for example, the camera module 1100a or 1100b) to generate a three-dimensional (3D) depth image.

In some embodiments, at least two (for example, the camera modules 1100a and 1100b) of the plurality of camera modules 1100a, 1100b, and 1100c may have different fields of view. In this case, for example, optical lenses of the at least two (for example, the camera modules 1100a and 1100b) of the plurality of camera modules 1100a, 1100b, and 1100c may differ, but embodiments are not limited thereto.

Also, in some embodiments, fields of view of the plurality of camera modules 1100a, 1100b, and 1100c may differ. In this case, optical lenses included in the plurality of camera modules 1100a, 1100b, and 1100c may differ, but embodiments are not limited thereto.

In some embodiments, the plurality of camera modules 1100a, 1100b, and 1100c may be disposed physically apart from one another. That is, a sensing region of one image sensor 1142 may not be divided and used by the plurality of camera modules 1100a, 1100b, and 1100c, and an independent image sensor 1142 may be disposed in each of the plurality of camera modules 1100a, 1100b, and 1100c.

Referring again to FIG. 14, the application processor 1200 may include an image processing device 1210, a memory controller 1220, and an internal memory 1230. The application processor 1200 may be implemented independently from the plurality of camera modules 1100a, 1100b, and 1100c. For example, the application processor 1200 and the plurality of camera modules 1100a, 1100b, and 1100c may be implemented as separate semiconductor chips separated from one another.

The image processing device 1210 may include a plurality of sub image processors 1212a, 1212b, and 1212c, an image generator 1214, and a camera module controller 1216.

The image processing device 1210 may include a number of sub image processors 1212a, 1212b, and 1212c corresponding to the number of camera modules 1100a, 1100b, and 1100c.

Pieces of image data generated from the camera modules 1100a, 1100b, and 1100c may be respectively provided to the sub image processors 1212a, 1212b, and 1212c through a plurality of image signal lines ISLa, ISLb, and ISLc apart from one another. For example, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. Such image data transmission may be performed by using, for example, a camera serial interface (CSI) based on a mobile industry processor interface (MIPI), but embodiments are not limited thereto.

In some embodiments, one sub image processor may be disposed to correspond to a plurality of camera modules. For example, the sub image processor 1212a and the sub image processor 1212c may not be implemented apart from each other like the illustration and may be integrated into one sub image processor, and the image data provided from each of the camera modules 1100a and 1100c may be selected through a selection element (for example, a multiplexer) and may be provided to an integrated sub image processor.

The image data provided to each of the sub image processors 1212a, 1212b, and 1212c may be provided to the image generator 1214. The image generator 1214 may generate an output image from the pieces of image data provided from the sub image processors 1212a, 1212b, and 1212c on the basis of a mode signal or generating information.

In detail, the image generator 1214 may merge at least some of the pieces of image data generated from the camera modules 1100a, 1100b, and 1100c having different fields of view to generate the output image, based on the mode signal or the generating information. Also, the image generator 1214 may select one piece of image data from among the pieces of image data generated from the camera modules 1100a, 1100b, and 1100c having different fields of view to generate the output image, based on the mode signal or the generating information.

In some embodiments, the generating information may include a zoom signal or a zoom factor. Also, in some embodiments, the mode signal may be, for example, a signal based on a mode selected by a user.

When the generating information includes the zoom signal (a zoom factor) and the camera modules 1100a, 1100b, and 1100c have different fields of view, the image generator 1214 may perform different operations on the basis of the kind of the zoom signal. For example, when the zoom signal is a first signal, the image generator 1214 may merge the image data output from the camera module 1100a and the image data output from the camera module 1100c, and then, may generate the output image by using a merged image signal and the image data which is not used for the mergence and is output from the camera module 1100b. For example, when the zoom signal is a second single differing from the first signal, the image generator 1214 may not perform merging of pieces of image data and may select one piece of image data from among the pieces of image data output provided from the camera modules 1100a, 1100b, and 1100c to generate the output image. However, embodiments are not limited thereto, and depending on the case, a method of processing image data may be variously modified.

In some embodiments, the image generator 1214 may receive pieces of image data having different exposure times from at least one of the plurality of sub image processors 1212a, 1212b, and 1212c and may perform high dynamic range (HDR) processing on the pieces of image data to generate merged image data where a dynamic range has increased.

The camera module controller 1216 may provide a control signal to each of the camera modules 1100a, 1100b, and 1100c. The control signal generated by the camera module controller 1216 may be provided to the camera modules 1100a, 1100b, and 1100c through the control signal lines CSLa, CSLb, and CSLc apart from one another.

One of the plurality of camera modules 1100a, 1100b, and 1100c may be designated as a master camera (for example, the camera module 1100b) on the basis of the mode signal or the generating information including the zoom signal, and the other camera modules (for example, the camera modules 1100a and 1100c) may be designated as slave cameras. Such information may be included in the control signal and may be provided to the camera modules 1100a, 1100b, and 1100c through the control signal lines CSLa, CSLb, and CSLc apart from one another.

A camera module operating as a master or a slave may be changed based on the zoom factor or an operation mode signal. For example, when a field of view of the camera module 1100a is broader than a field of view of the camera module 1100b and the zoom factor represents a low zoom ratio, the camera module 1100b may operate as a master and the camera module 1100a may operate as a slave. On the other hand, when the zoom factor represents a high zoom ratio, the camera module 1100a may operate as a master and the camera module 1100b may operate as a slave.

In some embodiments, the control signal provided from the camera module controller 1216 to each of the camera modules 1100a, 1100b, and 1100c may include a sync enable signal. For example, when the camera module 1100b is a master camera and the camera modules 1100a and 1100c are slave cameras, the camera module controller 1216 may transmit the sync enable signal to the camera module 1100b. The camera module 1100b provided with the sync enable signal may generate a sync signal on the basis of the sync enable signal and may provide the generated sync signal to the camera modules 1100a and 1100b through a sync signal line SSL. The camera module 1100b and the camera modules 1100a and 1100c may transmit the image data to the application processor 1200 in synchronization with the sync signal.

In some embodiments, the control signal provided from the camera module controller 1216 to the plurality of camera modules 1100a, 1100b, and 1100c may include mode information based on the mode signal. Based on the mode information, the plurality of camera modules 1100a, 1100b, and 1100c may operate as a first operation mode and a second operation mode in association with a sensing speed.

In the first operation mode, the plurality of camera modules 1100a, 1100b, and 1100c may generate an image signal at a first speed (for example, generate an image signal having a first frame rate), encode the image signal at a higher second speed than the first speed (for example, encode the image signal to have a second frame rate which is higher than the first frame rate), and transmit an encoded image signal to the application processor 1200. In this case, the second speed may be equal to or less than 30 times the first speed.

The application processor 1200 may store the transmitted image signal (i.e., the encoded image signal) in the memory 1230 included therein or the storage 1400 provided outside the application processor 1200, and then, may read and decode the encoded image signal from the memory 1230 or the storage 1400 and may display image data generated based on a decoded image signal. For example, a corresponding sub-processor among a plurality of sub-processors 1212a, 1212b, and 1212c included in the image processing device 1210 may perform decoding and may perform image processing on the decoded image signal.

In the second operation mode, the plurality of camera modules 1100a, 1100b, and 1100c may generate an image signal at a lower third speed than the first speed (for example, generate an image signal having a third frame rate which is lower than the first frame rate) and may transmit the generated image signal to the application processor 1200. The image signal provided to the application processor 1200 may be a signal which is not encoded. The application processor 1200 may perform image processing on the transmitted image signal, or may store an image-processed image signal in the memory 1230 or the storage 1400.

The PMIC 1300 may supply power (for example, a source voltage) to each of the plurality of camera modules 1100a, 1100b, and 1100c. For example, based on control by the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

In response to a power control signal PCON from the application processor 1200, the PMIC 1300 may generate power corresponding to each of the plurality of camera modules 1100a, 1100b, and 1100c and may adjust a level of the power. The power control signal PCON may include a power adjustment signal for an operation mode of each of the plurality of camera modules 1100a, 1100b, and 1100c. For example, the operation mode may include a low power mode, and in this case, the power control signal PCON may include information about a camera module operating based on the low power mode and information about a set power level. Levels of pieces of power respectively provided to the plurality of camera modules 1100a, 1100b, and 1100c may be the same or differ. Also, the levels of the pieces of power may dynamically vary.

While the inventive concept has been particularly shown and described with reference to certain illustrative embodiments, it will be understood that various changes in form and details may be made therein without departing from the spirit and scope of the following claims.

What is claimed is:

1. A pixel array comprising:
color filter array (CFA) cells, each respectively including CFA blocks, and each CFA block including a sub-block and color pixels of a same color arranged in a boundary region of the CFA block to circumscribe the sub-block, wherein
the sub-block includes at least one first color pixel sensing a first color, at least one second color pixel sensing a second color different from the first color, and at least one third color pixel sensing a third color different from the first color and the second color.

2. The pixel array of claim 1, wherein the sub-block includes a 2-by-2 arrangement of color pixels including one first color pixel, one second color pixel and two third color pixels.

3. The pixel array of claim 2, wherein the sub-block in each of the CFA blocks has a same color pattern.

4. The pixel array of claim 3, wherein the first color is red, the second color is blue and the third color is green.

5. The pixel array of claim 4, wherein the sub-block includes a green pixel disposed at an upper left position, a blue pixel disposed at an upper right position, a red pixel disposed at a lower left position and a green pixel disposed at a lower right position.

6. The pixel array of claim 4, wherein the sub-block includes a green pixel disposed at an upper left position, a red pixel disposed at an upper right position, a blue pixel disposed at a lower left position and a green pixel disposed at a lower right position.

7. The pixel array of claim 4, wherein the sub-block includes a blue pixel disposed at an upper left position, a green pixel disposed at an upper right position, a green pixel disposed at a lower left position and a red pixel disposed at a lower right position.

8. The pixel array of claim 4, wherein the sub-block includes a red pixel disposed at an upper left position, a green pixel disposed at an upper right position, a green pixel disposed at a lower left position and a blue pixel disposed at a lower right position.

9. The pixel array of claim 1, wherein:
the CFA blocks include a first CFA block and a second CFA block in a first row-wise arrangement,
a third CFA block and a fourth CFA block in a second row-wise arrangement,
the first CFA block and the third CFA block in a first column-wise arrangement, and the second CFA block and the fourth CFA block in a second column-wise arrangement.

10. The pixel array of claim 9 wherein the first color is red, the second color is blue and the third color is green.

11. The pixel array of claim 10, wherein one of the CFA blocks is a red CFA block predominantly including red pixels, one other of the CFA blocks is a blue CFA block predominantly including blue pixels, and two others of the CFA blocks are respectively green CFA blocks predominantly including green pixels.

12. The pixel array of claim 11, wherein the red CFA block predominantly includes red pixels in a boundary region of the red CFA block, the blue CFA block predominantly includes blue pixels in a boundary region of the blue CFA block, and the green CFA blocks respectively predominantly includes green pixels in boundary regions of the green CFA blocks.

13. An image sensor comprising:
a pixel array including color filter array (CFA) cells, each CFA cell including CFA blocks, and each CFA block including a sub-block and color pixels of a same color arranged in a boundary region of the CFA block to circumscribe the sub-block, wherein the sub-block includes at least one first color pixel sensing a first color, at least one second color pixel sensing a second color different from the first color, and at least one third color pixel sensing a third color different from the first color and the second color;
a row driver configured to generate control signals that control the generation of pixel signals by the color pixels of the pixel array;
a read circuit configured to generate pixel data from the pixel signals; and
a controller configured to control the row driver and the read circuit.

14. The image sensor of claim 13, further comprising a re-mosaic processor configured to perform a re-mosaic operation in relation to the pixel data to convert a color pattern of at least one of the CFA cells into a Bayer pattern.

15. The image sensor of claim 14, wherein a color pattern of the sub-block is the same as a color pattern of at least a portion of the Bayer pattern.

16. The image sensor of claim 13, wherein sub-blocks included in each of the CFA blocks are the same and include a 2-by-2 arrangement of color pixels including one red pixel, one blue pixel and two green pixels.

17. The image sensor of claim 13, wherein:
the CFA blocks include a first CFA block and a second CFA block in a first row-wise arrangement,
a third CFA block and a fourth CFA block in a second row-wise arrangement,
the first CFA block and the third CFA block in a first column-wise arrangement, and
the second CFA block and the fourth CFA block in a second column-wise arrangement.

18. The image sensor of claim 17, wherein one of the CFA blocks is a red CFA block that predominantly includes red pixels, one other of the CFA blocks is a blue CFA block that predominantly includes blue pixels, and two others of the CFA blocks are respective, green CFA blocks that predominantly include green pixels.

19. An image sensor pixel array comprising:
a plurality of color filter array (CFA) cells, each including a 2-by-2 arrangement of CFA blocks, wherein
each CFA block includes color pixels having a same color arranged in a boundary region of the CFA block to circumscribe a sub-block, wherein the sub-block includes at least one first color pixel sensing a first color, at least one second color pixel sensing a second color different from the first color, and at least one third color pixel sensing a third color different from the first color and the second color.

20. The image sensor pixel array of claim 19, wherein:
the 2-by-2 arrangement of CFA blocks includes a green CFA block, a red CFA block, and a blue CFA block,
the green CFA block including twelve green pixels surrounding the sub-block,
the red CFA block including twelve red pixels surrounding the sub-block, and
the blue CFA block including twelve blue pixels surrounding the sub-block.

* * * * *